(12) United States Patent
Fukutome

(10) Patent No.: US 9,100,195 B2
(45) Date of Patent: Aug. 4, 2015

(54) SWITCH DEVICE AND POWER SUPPLY CONTROL SYSTEM

(75) Inventor: Takahiro Fukutome, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 701 days.

(21) Appl. No.: 13/402,234

(22) Filed: Feb. 22, 2012

(65) Prior Publication Data

US 2012/0146428 A1    Jun. 14, 2012

Related U.S. Application Data

(63) Continuation of application No. 13/100,916, filed on May 4, 2011, now Pat. No. 8,125,107, and a continuation of application No. 12/003,279, filed on Dec. 21, 2007, now Pat. No. 7,939,972.

(30) Foreign Application Priority Data

Dec. 27, 2006  (JP) .................................. 2006-353281

(51) Int. Cl.
*B23K 11/24* (2006.01)
*H02B 1/24* (2006.01)
(Continued)

(52) U.S. Cl.
CPC .............. *H04L 12/10* (2013.01); *H04B 1/0003* (2013.01); *H02J 17/00* (2013.01); *H04W 52/0225* (2013.01); *H04W 52/0251* (2013.01)
USPC .......................................................... 307/112

(58) Field of Classification Search
CPC ....... H04L 12/10; H04B 1/0003; H02J 17/00; H04W 52/0225; H04W 52/0251
USPC .................................. 307/112, 116, 129, 126
See application file for complete search history.

(56) References Cited

U.S. PATENT DOCUMENTS 5,300,875 A    4/1994   Tuttle
6,330,175 B2   12/2001  Shirato et al.
(Continued)

FOREIGN PATENT DOCUMENTS

EP       1122872 A      8/2001
JP       06-237490      8/1994
(Continued)

OTHER PUBLICATIONS

International Search Report (Application No. PCT/JP2007/074615) dated Mar. 11, 2008.

(Continued)

*Primary Examiner* — Carlos Amaya
(74) *Attorney, Agent, or Firm* — Eric J. Robinson; Robinson Intellectual Property Law Office, P.C.

(57) ABSTRACT

The switch device includes a control switch that turns on/off an electrical connection between an apparatus and the power supply, a condition judging circuit that judges conditions of driving the control switch, an electric wave reception circuit that receives an electric wave, and a power supply circuit that generates power from the electric wave received by the electric wave reception circuit. An electric wave transmission device that transmits an electric wave for making the switch device operate is arranged in a space, whereby the electric wave can be received by the electric wave reception device in the specific space. The switch device controls the control switch to be turned off/on when the electric wave is received. Alternatively, when the electric wave is not received, the switch device turns on/off the control switch.

17 Claims, 6 Drawing Sheets

(51) Int. Cl.
  *H04L 12/10* (2006.01)
  *H04B 1/00* (2006.01)
  *H02J 17/00* (2006.01)
  *H04W 52/02* (2009.01)

(56) References Cited

U.S. PATENT DOCUMENTS

| | | | |
|---|---|---|---|
| 6,684,083 B1* | 1/2004 | Harimoto | 455/556.1 |
| 6,967,974 B1 | 11/2005 | Partyka | |
| 7,190,979 B1 | 3/2007 | Marshall et al. | |
| 7,250,695 B2 | 7/2007 | Connors et al. | |
| 7,351,921 B1 | 4/2008 | Haller et al. | |
| 7,505,794 B2 | 3/2009 | Watanabe et al. | |
| 7,737,658 B2 | 6/2010 | Sennami et al. | |
| 2002/0086635 A1 | 7/2002 | Tomono | |
| 2004/0058186 A1 | 3/2004 | Daulton | |
| 2004/0059392 A1 | 3/2004 | Parramon et al. | |
| 2004/0088032 A1 | 5/2004 | Haller et al. | |
| 2004/0098068 A1 | 5/2004 | Carbunaru et al. | |
| 2005/0021108 A1 | 1/2005 | Klosterman et al. | |
| 2005/0057905 A1 | 3/2005 | He et al. | |
| 2005/0093374 A1 | 5/2005 | Connors et al. | |
| 2005/0195930 A1 | 9/2005 | Spital et al. | |
| 2005/0254183 A1 | 11/2005 | Ishida et al. | |
| 2006/0012489 A1 | 1/2006 | Yokota et al. | |
| 2007/0032839 A1 | 2/2007 | Parramon et al. | |
| 2007/0057025 A1 | 3/2007 | Daulton | |
| 2007/0073360 A1 | 3/2007 | He et al. | |
| 2007/0135867 A1 | 6/2007 | Klosterman et al. | |
| 2008/0121419 A1 | 5/2008 | Haller et al. | |
| 2009/0292341 A1 | 11/2009 | Parramon et al. | |
| 2010/0293774 A1 | 11/2010 | Haller et al. | |
| 2010/0298910 A1 | 11/2010 | Carbunaru et al. | |
| 2011/0137378 A1 | 6/2011 | Klosterman et al. | |
| 2011/0313490 A1 | 12/2011 | Parramon et al. | |
| 2012/0197352 A1 | 8/2012 | Carbunaru et al. | |

FOREIGN PATENT DOCUMENTS

| | | |
|---|---|---|
| JP | 07-327328 A | 12/1995 |
| JP | 2000-196715 | 7/2000 |
| JP | 2001-068273 | 3/2001 |
| JP | 3080028 | 9/2001 |
| JP | 2002-044882 A | 2/2002 |
| JP | 2002-112349 A | 4/2002 |
| JP | 2002-186021 A | 6/2002 |
| JP | 2003-032746 A | 1/2003 |
| JP | 2003-087399 A | 3/2003 |
| JP | 2004-356937 A | 12/2004 |
| JP | 2006-025069 A | 1/2006 |
| JP | 2006-067365 | 3/2006 |
| JP | 2006-094395 | 4/2006 |
| JP | 2006-229654 | 8/2006 |
| KR | 2001-0078035 A | 8/2001 |
| WO | WO-2001/018980 | 3/2001 |
| WO | WO-2004/002572 | 1/2004 |

OTHER PUBLICATIONS

Written Opinion (Application No. PCT/JP2007/074615) dated Mar. 11, 2008.
Korean Office Action (Application No. 2009-7013766) Dated May 29, 2014.
European Search Report (Application No. 07851022.9) Dated Sep. 23, 2013.
Korean Office Action (Application No. 2009-7013766) Dated Mar. 5, 2015.

* cited by examiner

FIG. 6

SWITCH DEVICE AND POWER SUPPLY CONTROL SYSTEM

TECHNICAL FIELD

The present invention relates to a switch device that controls supply of power from a power supply with an electric wave. The present invention also relates to a power supply control system that has the switch device.

BACKGROUND ART

In apparatuses operating with electric power (such as household electric appliances and toys), power to be used is supplied from a battery or a commercial power supply, and a hand-operated switch for turning on/off the power supply is generally provided for such apparatuses. Further, supply of power to the apparatuses is controlled without contact by utilizing infrared communication with a remote controller or wireless communication with an electric wave.

For example, Reference 1 (Japanese Published Patent Application No. 2001-68273) describes control of lighted or unlighted states of an incandescent lamp by a wireless signal. Further, Reference 2 (Japanese Published Patent Application No. H6-237490) describes that a switch turned on/off with wireless communication is provided for a power receptacle and that centralized control of supply of power is performed by a wireless signal.

DISCLOSURE OF INVENTION

Many apparatuses operating with electric power (hereinafter, referred to as power) consume power constantly when the apparatuses are connected to each power supply. In addition, forgetting of switch-off is a cause to increase in consumption of power. If the apparatuses consume power when they are not used, an apparatus operating with a battery has a problem that power is insufficient when the apparatus is desired to be used, so that the apparatus cannot be used.

Although the control of power with wireless communication is described in References 1 and 2, the control of power is not started until wireless communication is intentionally performed by users. References 1 and 2 do not take measures against forgetting of switch-off by the users.

In view of the foregoing problems, it is an object of the present invention to provide a switch device that is controlled by an electric wave making it possible that power of an apparatus is not consumed when the apparatus is not used, or that forgetting of switch-off by users is prevented. It is another object to provide a power supply control system that includes this switch device.

The switch device of the present invention is a switch that is controlled by an electric wave in order to achieve the above object, and that controls electrical connection between a power supply and a circuit such as a driver circuit or a control circuit incorporated in the apparatus. The switch device of the present invention includes a control switch to turn on/off electrical connection between the apparatus and the power supply, a condition judging circuit to judge conditions of driving the control switch, an electric wave reception circuit to receive an electric wave, and a power supply circuit to generate power from the electric wave received by the electric wave reception circuit.

Note that the circuit in the apparatus connected to the switch device of the present invention is not particularly restricted, and the circuit is acceptable as long as it is included in the apparatus. For example, the following circuits can be given: a simple circuit like a circuit formed using an element such as an T ED and a wiring for connecting the element to a power supply; a control circuit to control a motor; a control circuit to adjust luminance of the LED; and a large-scale integrated circuit including a microcomputer.

The electric wave reception circuit has an antenna and receives an electric wave of a specific band in accordance with a structure of the antenna. The condition judging circuit judges that whether or not power supply voltage is generated by the power supply circuit, and the control switch is turned on/off based on the judgment.

For example, when an electric wave of a specific band is received, the control switch is turned off. When the electric wave of the specific band is not received, in other words, when the power is not generated by the power supply circuit, the control switch is turned on. In this manner, supply of power to the apparatus can be automatically stopped in an area where the switch device can receive the electric wave of a specific band.

In another example, when an electric wave of a specific band is received, the control switch is turned on. When the electric wave of a specific band is not received, in other words, when the power is not generated by the power supply circuit, the control switch is turned off. In such a manner, supply of power to the apparatus can be automatically started in an area where the switch device can receive the electric wave of a specific band.

In order to make the switch device operate as described, the power supply control system of the present invention includes a switch device incorporated in an apparatus and a transmission device that transmits an electric wave of a specific band.

In other words, the power supply control system of the present invention defines a space where the switch device can receive an electric wave of a specific band by transmitting an electric wave from the transmission device. In the defined space, supply of power to the apparatus can be automatically stopped or started by the switch device.

The switch device of the present invention can provided with a sensor. In this case, the condition judging circuit judges conditions of turning on/off the control switch from an output of the sensor circuit and an output of the power supply circuit. As the sensor, various sensors that monitor environment (such as a light sensor, a thermal sensor, a humidity sensor, a vibration sensor, an acceleration sensor, a gas sensor, a magnetic field sensor, and a rotation sensor), various biological sensors (such as a finger print sensor, a vein sensor, and a retina sensor), or the like can be used.

In the case of including a control circuit that controls supply of power, operation state, and the like in the apparatus, the switch device of the present invention can omit the control switch. In this case, an output side of the judging circuit is connected to the control circuit in the apparatus, and the control circuit in the apparatus controls supply of power based on an output signal from the judging circuit.

In the present invention, electrical connection between the apparatus and the power supply can be automatically controlled by an electric wave. For example, even when users forget switch-off of the apparatus, supply of power to the apparatus can be automatically stopped. In this manner, by automatically stopping supply of power to the apparatus, power consumption of the apparatus can be suppressed.

BEST MODE FOR CARRYING OUT THE INVENTION

Hereinafter, an embodiment mode and embodiments of the present invention will be described below with reference to the accompanying drawings. Note that the present invention can be implemented in many different modes and it is easily understood by those skilled in the art that modes and details can be modified in various ways without departing from the purpose and the scope of the present invention. Accordingly, the present invention should not be interpreted as being limited to the description of the embodiment mode and the embodiments below. Note that like portions in the drawings may be denoted by the like reference numerals in all drawings for describing the embodiment mode and the embodiments of the present invention, and the repetition description is omitted.

A switch device of the present invention and a power supply control system of the present invention will be described with reference to FIG. 1.

A switch device 100 is incorporated in an apparatus that operates with power supplied from a power supply 102. The switch device 100 controls supply of power from the power supply 102 to a circuit 103 that is incorporated in the apparatus. The power supply control system of the present invention includes an electric wave transmission device 104 that transmits an electric wave for making the switch device 100 operate, in addition to the switch device 100.

The power supply 102 is a commercial power supply, a battery (such as a dry battery or a secondary battery) that is incorporated in an apparatus, or the like. There is not particular restriction on the circuit 103, and the circuit 103 is acceptable as long as it is various circuits that operate by being electrically connected to the power supply 102. For example, the circuit 103 can be a simple circuit formed using an LED and a wiring connected to the LED, a control circuit that controls a motor, a control circuit that adjusts luminance of the LED or the like, a large-scale integrated circuit including a microcomputer, and the like.

The switch device 100 includes a control switch 111, a condition judging circuit 112, a power supply circuit 113, an electric wave reception circuit 114 that has an antenna 114a, an auxiliary power supply 115, and a sensor circuit 116. As described below, the auxiliary power supply 115 and the sensor circuit 116 may be provided as needed.

The control switch 111 turns on/off electrical connection between the power supply 102 and the circuit 103, and is controlled by the condition judging circuit 112. An output of the power supply circuit 113 and an output of the sensor circuit 116 are inputted to the condition judging circuit 112.

The electric wave reception circuit 114 has the antenna 114a and receives an electric wave that is transmitted from the electric wave transmission device 104. The antenna 114a may have a structure that is suitable for receiving an electric wave of a band which is transmitted from the electric wave transmission device 104. For example, as the antenna 114a, a chip antenna, a dipole antenna, a loop antenna, or the like can be used.

The power supply circuit 113 can be formed using a rectifier circuit and a regulator. An electric wave signal received by the electric wave reception circuit 114 is rectified by the rectifier circuit, and the regulator is used, whereby constant voltage can be generated. The generated power is used for power of the sensor circuit 116, the condition judging circuit 112, and the control switch 111. In addition, the generated power is used for charging power of the auxiliary power supply 115.

The switch device 100 of the present invention dose not use the main power supply (power supply 102) but uses the generated power from the received electric wave for driving the control switch 111. Therefore, even when the apparatus is mounted with the switch device 100, power consumption by the main power supply is not increased.

The auxiliary power supply 115 may be provided as needed. By using the auxiliary power supply 115, it can be used for supply of power to the sensor circuit 116, the condition judging circuit 112, and the control switch 111. Even when the power cannot be generated by the power supply circuit 113, the switch device 100 can be made to operate by supplying power from the auxiliary power supply 115. In addition, the auxiliary power supply 115 can supply power to the circuit 103 of the apparatus as power for controlling the apparatus in which the supply of power is stopped.

As the auxiliary power supply 115, for example, an electric double-layer capacitor that can be charged with power generated by the power supply circuit 113 can be used. Further, a solar battery can be used as the auxiliary power supply 115.

The condition judging circuit 112 is driven by power generated by the power supply circuit 113. Turning on/off the control switch 111 is controlled based on an output signal of the power supply circuit 113 and an output signal of the sensor circuit 116.

The condition judging circuit 112 judges that whether or not power is supplied from the power supply circuit 113 and controls turning on/off the control switch 111. In other words, the switch device 100 of the present invention controls turning on/off the control switch 111 depending on the condition that whether or not the electric wave is received by the electric wave reception circuit 114.

As one of the conditions of turning on/off the control switch 111, the control switch 111 can be turned off when the electric wave reception circuit 114 receives an electric wave of a specific band which is transmitted from the electric wave transmission device 104. At this time, supply of power to the circuit 103 in the apparatus can be automatically stopped in an area where the electric wave reception circuit 114 of the switch device 100 can receive the electric wave of a specific band which is transmitted from the electric wave transmission device 104; therefore, the apparatus does not consume power.

As another condition, the control switch 111 can be turned on when the electric wave reception circuit 114 receives an electric wave of a specific band which is transmitted from the electric wave transmission device 104. At this time, in an area where the switch device 100 can receive the electric wave of a specific band, supply of power to the circuit 103 can be automatically started.

Further, the apparatus to which power is supplied from the power supply 102 may be provided with a hand-operated switch 105 of which turning on/off is controlled by hand of users. Although the hand-operated switch 105 is provided between the power supply 102 and the control switch 111 in an example of FIG. 1, the hand-operated switch 105 can be provided between the control switch 111 and the circuit 103.

In a case where the control switch 111 is controlled to be turned off at the time of receiving an electric wave, the control switch 111 is preferably set to be on all the time when power is not supplied to the control switch 111. In this case, supply of power to the apparatus from the power supply 102 can be automatically stopped by control switch 111 in an area where a specific electric wave can be received. On the other hand, in an external of area, users can control supply of power to the apparatus with the hand-operated switch 105.

In a case where the control switch 111 is controlled to be on at the time of receiving an electric wave, the control switch 111 is preferably set to be off all the time when the power is not supplied to the control switch 111. In this case, the users can control supply of power to the apparatus from the power supply 102 with the hand-operated switch 105 in an area where a specific electric wave can be received. On the other hand, in an external of the area, supply of power to the apparatus from the power supply 102 can be automatically stopped by the control switch 111.

In such a manner by the present invention, even if the users forget turning off the hand-operated switch 105, supply of power to the apparatus can be automatically stopped depending on presence or absence of the reception of the electric wave. Further, by stopping supply of power to the apparatus automatically, power consumption of the apparatus can be suppressed.

The sensor circuit 116 may be provided as needed. When the sensor circuit 116 is provided, a detection result by the sensor circuit 116 can be added to conditions of limiting supply of power to the apparatus, in addition to presence or absence of generating power supply voltage by the power supply circuit 113.

As a sensor of the sensor circuit 116, an environment sensor that detects environment where the apparatus is used or a biological sensor that distinguishes users can be used. As the environment sensor, for example, a light sensor, a thermal sensor, a humidity sensor, a vibration sensor, an acceleration sensor, a gas sensor, a magnetic field sensor, a rotation sensor, or the like can be used. As a biological sensor, a finger print sensor, a vein sensor, a retina sensor, or the like can be used.

For example, by using a light sensor for the sensor of the sensor circuit 116, the control switch 111 can be controlled to be automatically turned off in an area where the switch device 100 can receive an electric wave of a specific band when two conditions are satisfied. One of the conditions is that an electric wave is received by judging an output of the power supply circuit 113, and the other is that surroundings is dark judging an output of the sensor circuit 116. Note that the sensor of the sensor circuit 116 is not limited to one, but as the sensor of the sensor circuit 116, plural kinds of sensors may be used.

The electric wave transmission device 104 is a device to transmit an electric wave of a specific band which can be received by the electric wave reception circuit 114. The electric wave is transmitted from the antenna 104a of the electric wave transmission device 104. Power that makes the electric wave transmission device 104 operate may be provided by a commercial power supply or a battery. Further, by providing the electric wave transmission device with an electric wave reception circuit and a power supply circuit, power is generated from a received electric wave, and the power can make the electric wave transmission device 104 operate.

By providing the electric wave transmission device 104 for a storage box, a cabinet, a showcase, a shop window, vehicles such as a train and an airplane, a meeting room, a movie theater, a museum, a public space, and the like, an area where an electric wave of a specific band can be received is provided. As a result, by placing the switch device 100 of the present invention in this area, the switch device 100 can be used as an area sensor that automatically controls turning on/off an apparatus by receiving the electric wave.

[Embodiment 1]

Figure 2:
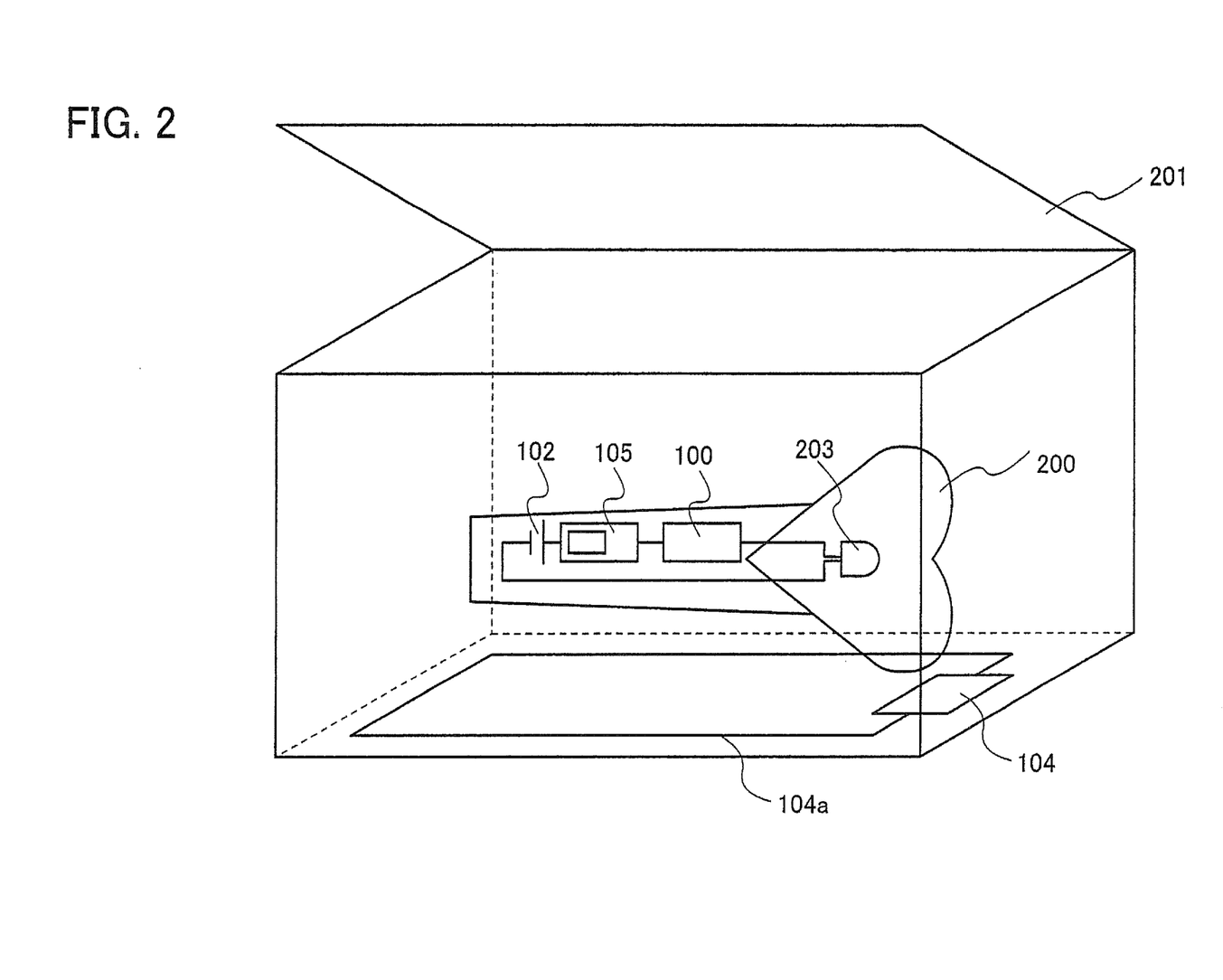
FIG. 2 is a diagram illustrating a structural example of a toy and a storage box of the toy for which a power supply control system of the present invention is implemented.

This embodiment will describe a specific example of a power supply control system provided with a switch device. Here, a toy and a storage box of the toy are used as an example. FIG. 2 is a diagram illustrating a power supply control system of this embodiment. The power supply control system of FIG. 2 includes a toy 200 and a storage box 201 that houses the toy.

In the toy 200, an LED 203 emits light by supply of power from a power supply 102. The power supply 102 is built in the toy 200, and, for example, a dry battery or a secondary battery is used for the toy 200.

The toy 200 is provided with a switch device 100 for controlling turning on/off connection between the LED 203 and the power supply 102, and a hand-operated switch 105. A structure of the switch device 100 is similar to that of FIG. 1, which includes a control switch 111, a condition judging circuit 112, a power supply circuit 113, an electric wave reception circuit 114 that has an antenna 114a, an auxiliary power supply 115, and a sensor circuit 116. Note that the auxiliary power supply 115 and the sensor circuit 116 may be provided as needed.

An electric wave transmission device 104 that has an antenna 104a is incorporated in the storage box 201. In the example of FIG. 2, a loop antenna is used for the antenna 104a, and the antenna 104a is provided at a bottom of the storage box 201. Note that power of the electric wave transmission device 104 can be supplied from a commercial AC power supply or a battery. Further, power can be generated from the received electric wave by the electric wave transmission device 104, and the electric wave transmission device 104 can be made to operate by this power.

In the conventional case, if a user stores the toy 200 in the storage box 201 without turning off the hand-operated switch 105 or the hand-operated switch 105 is turned on unintentionally in the storage box 201, power of the battery that is used as the power supply 102 is consumed. As a result, when the user takes out the toy 200 of the storage box 201 to play with the toy 200, the toy 200 cannot be made to operate. The power supply control system of this embodiment is a power supply control system for solving such a problem.

Therefore, the switch device 100 of this embodiment is constructed so that the control switch 111 is turned off when power supply voltage is generated by the power supply circuit 113 by receiving a specific electric wave. In addition, the switch device 100 is also formed so that the control switch 111 is kept on all the time when the electric wave is not received. In this case, the control switch 111 is a switch that is turned on when power is not supplied.

Further, by transmitting an electric wave from the electric wave transmission device 104, the switch device 100 receives a specific electric wave, and the power supply circuit 113 can generate power supply voltage in the storage box 201.

When the toy 200 is housed in the storage box 201, in the switch device 100, the electric wave transmitted from the electric wave transmission device 104 is detected by the electric wave reception circuit 114. The condition judging circuit 112 turns off the control switch 111 by receiving power from the power supply circuit 113. As a result, the supply of power from the power supply 102 to the LED 203 is stopped. Accordingly, even when the toy 200 is housed in the storage box 201 with the hand-operated switch 105 turned on, the supply of power to the LED 203 can be automatically stopped when the toy 200 is in the storage box 201.

When the toy 200 is taken out of the storage box 201, the switch device 100 gets out of the range where the electric wave can be received, and therefore, the power supply circuit 113 does not generate power supply voltage. Then, the power is not supplied to the control switch 111, and the control switch 111 is turned on. Since the control switch 111 is turned on, the toy 200 is in a state in which the LED 203 can be lighted with the hand-operated switch 105.

In this embodiment, it is preferable to detect illuminance by providing the sensor circuit 116. It is possible to turn off the control switch 111 when power is generated by the power supply circuit 113 and it is detected that an inside of the storage box 201 becomes dark based on illuminance detected by the sensor circuit 116. For example, the storage box 201 is designed so that the inside thereof can get dark, like a case of providing the storage box 201 with a cover as shown in FIG. 2. In the case, when the toy 200 is housed in the storage box 201 and the storage box 201 is closed, the power of the toy 200 can be shut off. Even if the cover or the like is not provided for the storage box 201, in the nighttime, the power supply of the toy 200 can be automatically turned off as long as the toy 200 is in the storage box 201.

The electric wave transmission device 104 is preferably started with closing the storage box 201 with the cover. In the case of the storage box 201 without the cover, the electric wave transmission device 104 can be started or stopped with turning on/off a lighting system in a room where the storage box 201 is placed. When the lighting system is turned off, the electric wave transmission device 104 transmits an electric wave.

Although this embodiment describes the power supply control system by giving the toy 200 and the storage box 201 as an example, the power supply control system of this embodiment can be applied to an apparatus operating with power and a box or space where the apparatus is housed.

[Embodiment 2]

This embodiment will describe an adapter for a power supply which has a switch device of the present invention and an example in which a power supply control system of the present invention is applied to a space such as a display space in a mass merchandising store of electric products. As the power supply control system of this embodiment, an adapter that has a switch device is connected to a plug socket for a commercial power supply which is provided in the display space, and an electric wave transmission device is arranged in the display space.

Figure 3:
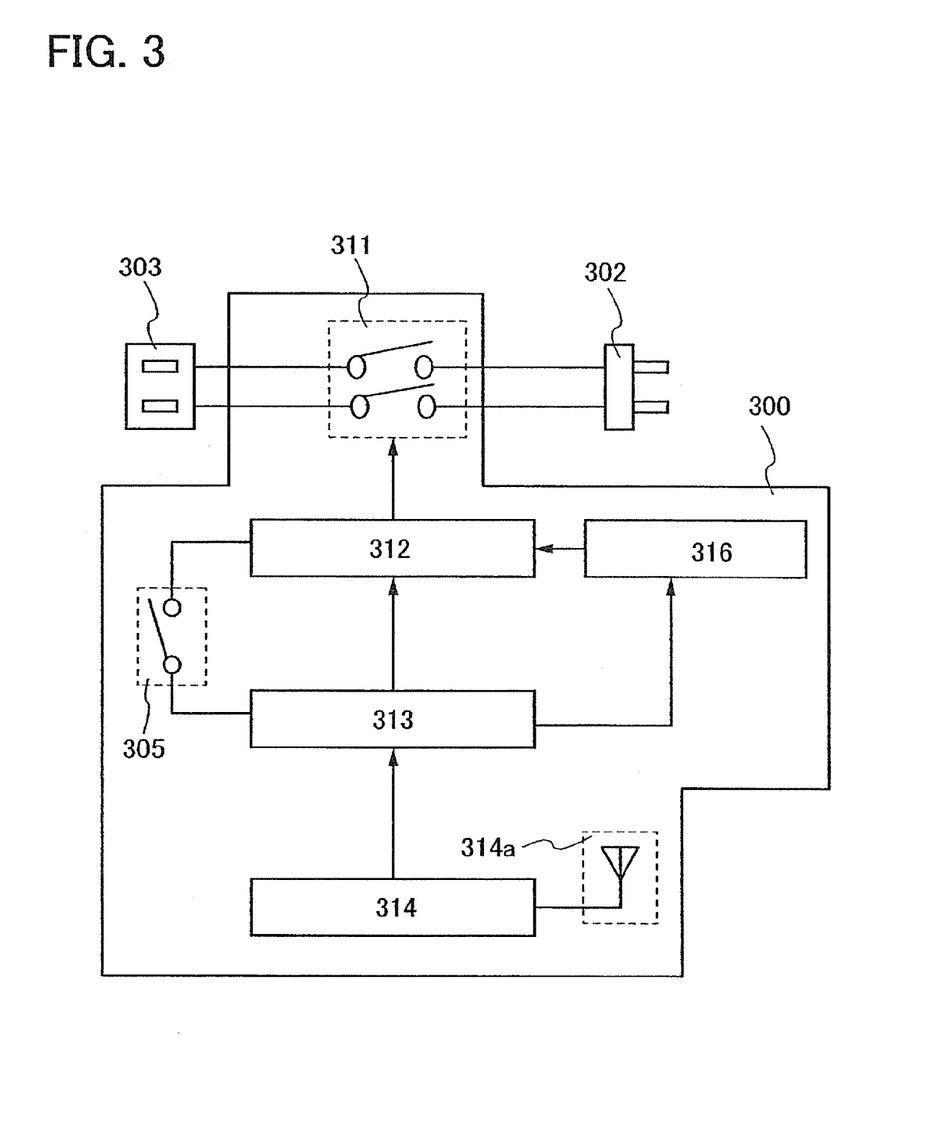
FIG. 3 is a block circuit diagram of an adapter for implementing a power supply control system of the present invention.
Figure 4:
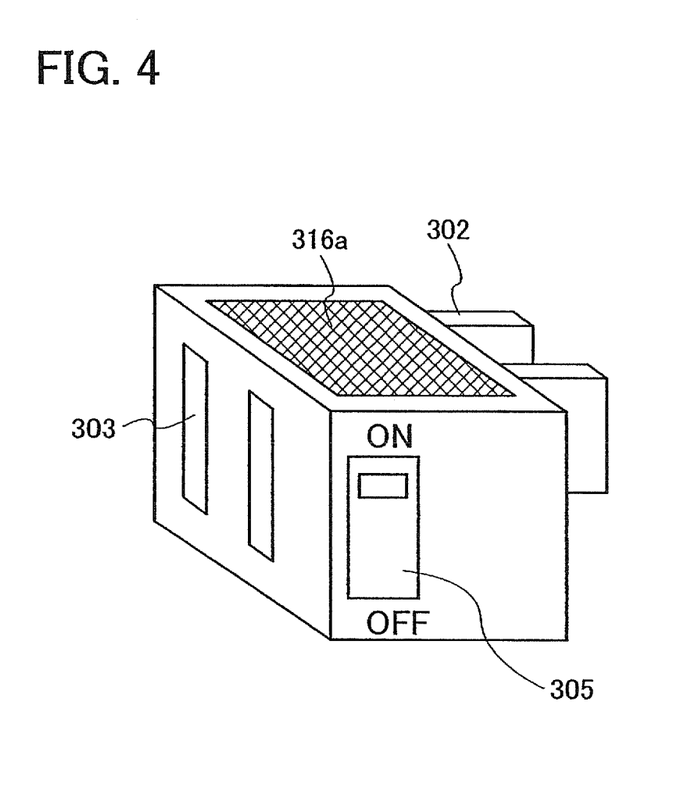
FIG. 4 is an external view of an adapter of the present invention of FIG. 3.

FIG. 3 is a block circuit diagram of an adapter of this embodiment. FIG. 4 is an external view of the adapter of this embodiment. As shown in FIGS. 3 and 4, the adapter has a plug 302 that is inserted into a plug socket for a commercial power supply and a plug socket 303 into which a plug of an apparatus is inserted. A switch device 300 is incorporated in a chassis of the adapter. The switch device 300 controls electrical connection between the plug 302 and the plug socket 303 by receiving an electric wave.

The switch device 300 includes a control switch 311, a condition judging circuit 312, a power supply circuit 313, an electric wave reception circuit 314 that has an antenna 314a, and a sensor circuit 316 as shown in FIG. 3. In addition, the switch device 300 also includes a mode selector switch 305 that is connected to the condition judging circuit 312. The mode selector switch 305 is a switch that can be controlled by hand as shown in FIG. 4. Note that the mode selector switch 305 can also be controlled wirelessly instead of being controlled by hand.

The mode selector switch 305 is a switch for switching operation mode of the switch device 300 and switches on/off the control switch 311 when the power supply circuit 313 generates power. The condition judging circuit 312 turns on the control switch 311 when the mode selector switch 305 is turned on. The condition judging circuit 312 turns off the control switch 311 when the mode selector switch 305 is turned off.

Figure 1:
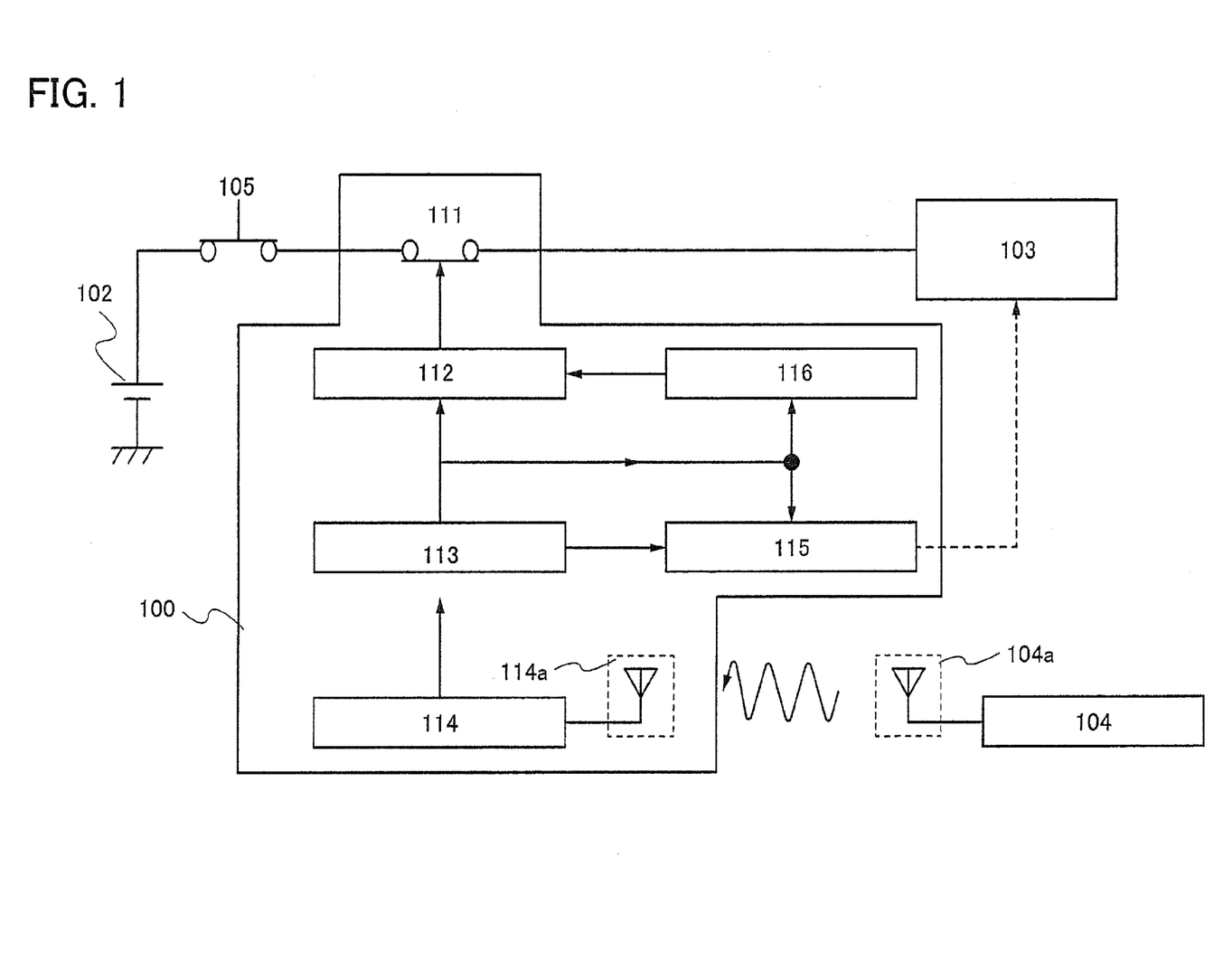
FIG. 1 is a block diagram illustrating a structural example of a switch device and a power supply control system of the present invention.

Other than the mode selector switch 305, a specific structure and operation of the switch device 300 of FIG. 3 are similar to those of the switch device 100 of FIG. 1; therefore, the detailed description is omitted.

The sensor circuit 316 may be provided as needed. In this embodiment, an example in which a light sensor 316a is used for the sensor circuit 316 is shown. As shown in FIG. 4, the light sensor 316a is provided on a top surface of the adapter.

In this embodiment, an electric wave transmission device to transmit an electric wave of a specific band which can be received by the electric wave reception circuit 314 is arranged in a specific space such as a display space or an inside of a store. Furthermore, the adapter shown in FIGS. 3 and 4 is inserted into a plug socket for a commercial power supply provided in the space, whereby the power supply control system is constructed. By inserting the plug of an apparatus into the adapter, the switch device 300 incorporated in the adapter can control turning on/off the apparatus.

When the power supply of the apparatus connected to the adapter is necessary to be automatically turned off, the mode selector switch 305 is set to be off. In the case of receiving an electric wave of a specific band by the electric wave reception circuit 314 of the adapter, the condition judging circuit 312 turns off the control switch 311.

When the sensor circuit 316 is used, an output signal from the sensor circuit 316 can be added to conditions of turning off the control switch 311. For example, by using the light sensor 316a, illuminance of the display space can be detected. When the condition judging circuit 312 judges that illuminance in the store is low based on an output signal from the sensor circuit 316 and that an electric wave is received based on an output of the power supply circuit 313, the control switch 311 is turned off.

When the power supply of the apparatus connected to the adapter is necessary to be automatically turned on, the mode selector switch 305 is set to be on. In the case of receiving an electric wave of a specific band by the electric wave reception circuit 314 of the adapter, the condition judging circuit 312 turns on the control switch 311.

Further, when the sensor circuit 316 is used, an output signal from the sensor circuit 316 can be added to conditions of turning on the control switch 311. By using the light sensor 316a, illuminance of a space where the apparatus is placed can be added to the conditions. When the condition judging circuit 312 judges that illuminance of the space is high based on the output signal from the sensor circuit 316 and that the electric wave is received based on the output of the power supply circuit 313, the control switch 311 is turned on.

As described above, by switching operation mode of the adapter with the mode selector switch 305 of the adapter and using the sensor circuit 316 that has the light sensor 316a, power supply voltage can be supplied to the apparatus when the store is opened, and supply of power to the apparatus can be stopped after the store is closed. In such a manner, the power supply control system can make the apparatus operate in a specific space when the space is light. Therefore, for example, the power supply control system of the present invention is applied to a space (display space) where the customers try out appliances in a mass merchandising store of electric products or the like, whereby the trial appliances can be set so that power supplies thereof can be turned on only during opening hours.

[Embodiment 3]

In vehicles such as trains, buses, and airplanes, the use of an apparatus that emits an electric wave, which affects a pacemaker and the like concerning human lives, is limited. In the case of cellular phones, they are required to be set to a silent mode or turned off. Further, in a meeting room, watching movie, looking at art, and the like, a receive mode of the cellular phone is set to the silent mode as manners. This embodiment will describe a power supply control system that sets a cellular phone to a silent mode automatically in a specific space such as the insides of vehicles and public facilities by mounting the cellular phone with a switch device of the present invention.

Figure 5:
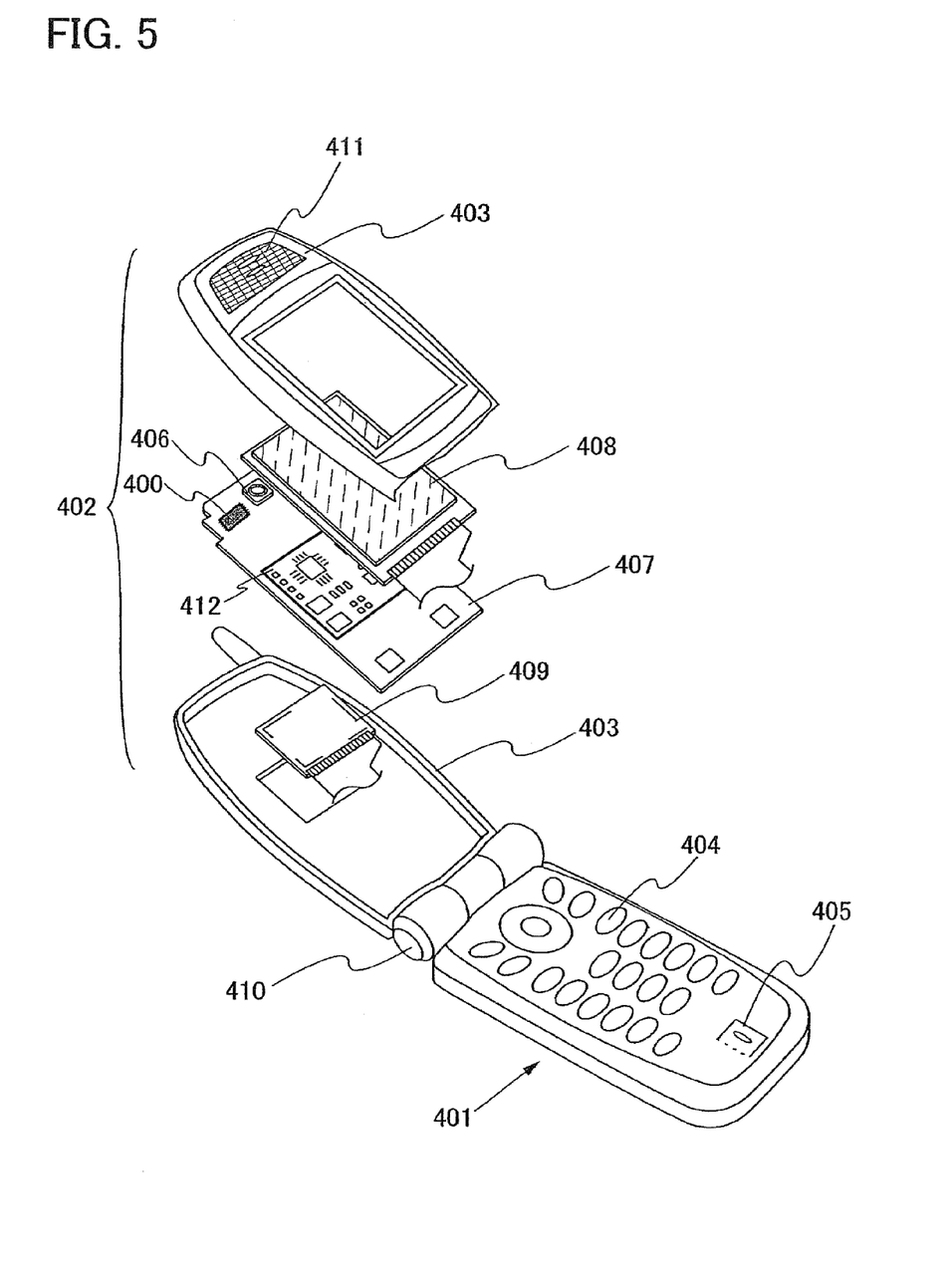
FIG. 5 is an exploded view of a cellular phone in which a switch device of the present invention is mounted.

FIG. 5 is an exploded view of a cellular phone mounted with a switch device of the present invention. As shown in FIG. 5, the cellular phone includes a main body (A) 401, a main body (B) 402, a chassis 403, operation keys 404, an audio input portion 405, an audio output portion 406, a circuit board 407, a display panel (A) 408, a display panel (B) 409, a hinge 410, and a light-transmitting material portion 411.

The circuit board 407 is mounted with a control circuit 412 that controls supply of power, switching the receive modes, and the like; and a switch device 400. The switch device 400 of this embodiment is shaped in a chip and can be easily mounted on the circuit board 407 as a component.

Figure 6:
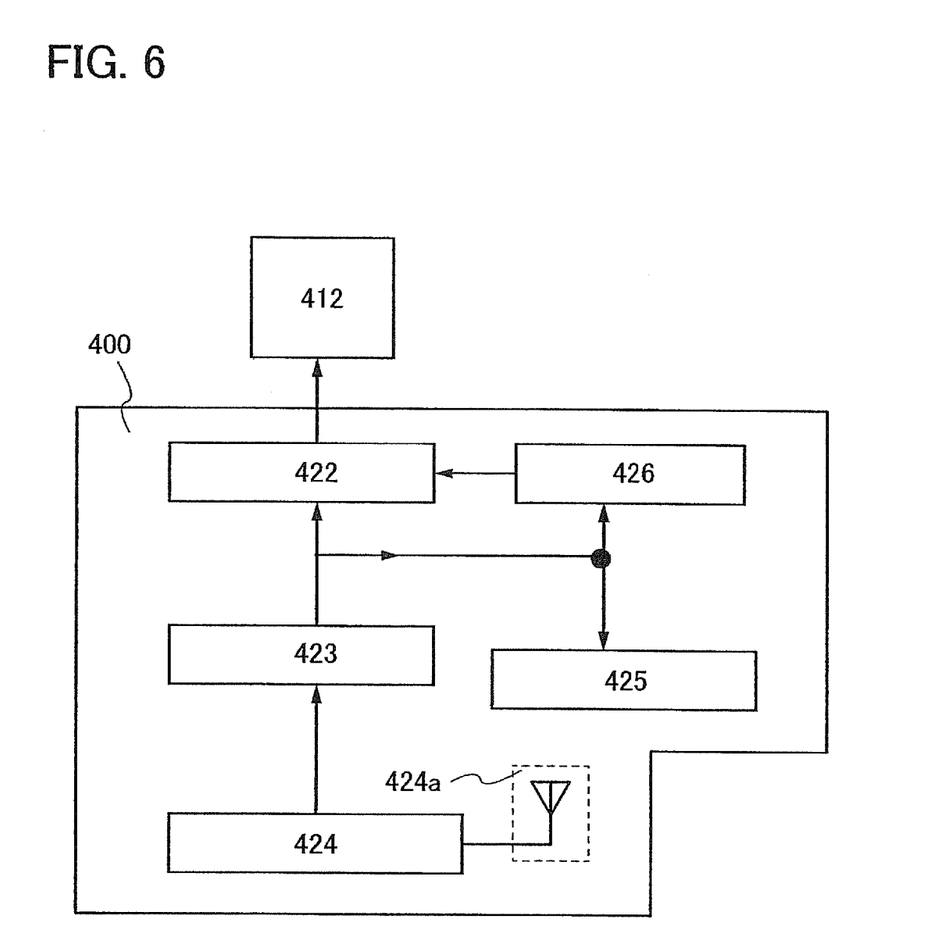
FIG. 6 is a block circuit diagram of a switch device that is mounted in the cellular phone of FIG. 5.

FIG. 6 is a block circuit diagram of the switch device 400 of this embodiment. As shown in FIG. 6, the switch device 400 includes a condition judging circuit 422, a power supply circuit 423, an electric wave reception circuit 424 that has an antenna 424a, an auxiliary power supply 425, and a sensor circuit 426.

Since the specific structure and operation of the switch device 400 are similar to those of the switch device 100 in FIG. 1, detailed description is omitted. An output side of the condition judging circuit 422 is connected to a control circuit 412 of the cellular phone, which is a different point from the switch device 100 in FIG. 1.

An electric wave transmission device which transmits an electric wave of a specific band that can be received by the electric wave reception circuit 424 is arranged in a space to set the cellular phone to a silent mode forcibly, whereby a power supply control system of the cellular phone can be constructed. For example, the electric wave transmission device is provided in a space where the ring alert of the cellular phone is not preferably rung, such as insides of vehicles like trains, buses, airplanes, and the like; public facilities like hospitals, museums, movie theaters, and the like; and meeting rooms.

When the electric wave reception circuit 424 of the cellular phone receives an electric wave of a specific band, the power supply circuit 423 generates power. When the condition judging circuit 422 detects that the power supply circuit 423 generates power, the condition judging circuit 422 outputs a control signal for switching over the cellular phone to a silent mode to the control circuit 412 of the cellular phone. In such a manner, the cellular phone can be forcibly made to switch over to the silent mode in the specific space. Instead of switching over to the silent mode, the cellular phone may be controlled so that the power supply can be turned off.

In a case where the electric wave reception circuit 424 does not receive the electric wave of a specific band, the power supply circuit 423 does not generate power. When the condition judging circuit 422 detects that the power supply circuit 423 does not generate power, the condition judging circuit 422 outputs a control signal to cancel the silent mode or turn on the power supply. Alternatively, in a case where the condition judging circuit 422 does not output the signal because the power is not supplied to the condition judging circuit 422, the control circuit 412 controls the receive mode and power of the cellular phone.

Using an acceleration sensor for the sensor circuit 426 makes it possible to detect presence of cellular phones in traveling vehicles. When the acceleration sensor detects acceleration for a certain period, the condition judging circuit 422 is made to judge that the cellular phones are placed in the traveling vehicle. In this case, the condition judging circuit 422 judges that whether or not the electric wave is received and whether or not the acceleration is detected for a certain period by the acceleration sensor. In a case where the electric wave is received and the acceleration is detected by the sensor circuit 426, the condition judging circuit 422 outputs a signal for setting the cellular phone to the silent mode or turning off the power supply to the control circuit 412.

Although this embodiment describes the cellular phone as an example, the switch device of this embodiment can be applied to various electronic apparatus to emit an electric wave, such as a digital camera, a portable game machine, a portable music reproducer, and an image reproducer. By applying the switch device of this embodiment, the power supplies of various electronic apparatuses are automatically turned off in a specific space so as not to be turned on. In the external of the space, the power supplies can be turned on/off by users. When the supply of power of the electronic apparatus is controlled in such a manner, malfunction of electronic apparatuses such as a pacemaker and electronic devices of an airplane, which affects human lives due to an electric wave of the electronic device, can be prevented.

This application is based on Japanese Patent Application serial no. 2006-353281 filed with Japan Patent Office on Dec. 27, 2006, the entire contents of which are hereby incorporated by reference.

What is claimed is:

1. An adapter comprising:
   a plug;
   a plug socket; and
   a switch device comprising:
      a first circuit configured to receive an electric wave;
      a second circuit configured to generate a power from the electric wave received by the first circuit; and
      a third circuit configured to judge a status of the generation of the power in the second circuit; and
      a first switch configured to turn on/off an electrical connection between the plug and the plug socket in accordance with an output of the third circuit.

2. The adapter according to claim 1,
   wherein the switch device further comprises a sensor circuit, and
   wherein the output of the sensor circuit is electrically connected to the third circuit.

3. The adapter according to claim 2, wherein the sensor circuit comprises a light sensor.

4. The adapter according to claim 1, wherein the switch device further comprises a power supply configured to be charged with a part of the power.

5. The adapter according to claim 4, wherein the power supply is a condenser or a battery.

6. An adapter comprising:
   a plug;
   a plug socket; and a switch device comprising:
- a first circuit configured to receive an electric wave;
- a second circuit configured to generate a power from the electric wave received by the first circuit; and
- a first switch;
- a third circuit configured to judge a status of the generation of the power in the second circuit and a status of the first switch; and
- a second switch configured to turn on/off an electrical connection between the plug and the plug socket in accordance with an output of the third circuit.

7. The adapter according to claim 6,
wherein the switch device further comprises a sensor circuit, and
wherein the output of the sensor circuit is electrically connected to the third circuit.

8. The adapter according to claim 7, wherein the sensor circuit comprises a light sensor.

9. The adapter according to claim 6, wherein the first switch is controlled by hand.

10. The adapter according to claim 6, wherein the first switch is controlled wirelessly.

11. The adapter according to claim 6, wherein the switch device further comprises a power supply configured to be charged with a part of the power.

12. The adapter according to claim 11, wherein the power supply is a condenser or a battery.

13. An adapter comprising:
a plug;
a plug socket; and
a switch device comprising:
- a first circuit configured to receive an electric wave, the first circuit comprising an antenna;
- a second circuit configured to generate a power from the electric wave received by the first circuit; and
- a third circuit configured to judge a status of the generation of the power in the second circuit; and
- a first switch configured to turn on/off an electrical connection between the plug and the plug socket in accordance with an output of the third circuit.

14. The adapter according to claim 13,
wherein the switch device further comprises a sensor circuit, and
wherein the output of the sensor circuit is electrically connected to the third circuit.

15. The adapter according to claim 14, wherein the sensor circuit comprises a light sensor.

16. The adapter according to claim 13, wherein the switch device further comprises a power supply configured to be charged with a part of the power.

17. The adapter according to claim 16, wherein the power supply is a condenser or a battery.

* * * * *